April 16, 1968     R. S. WEBB     3,378,667
PER PULSE CUTOFF ELECTRICAL DISCHARGE MACHINING APPARATUS
Filed Oct. 2, 1963     2 Sheets-Sheet 1
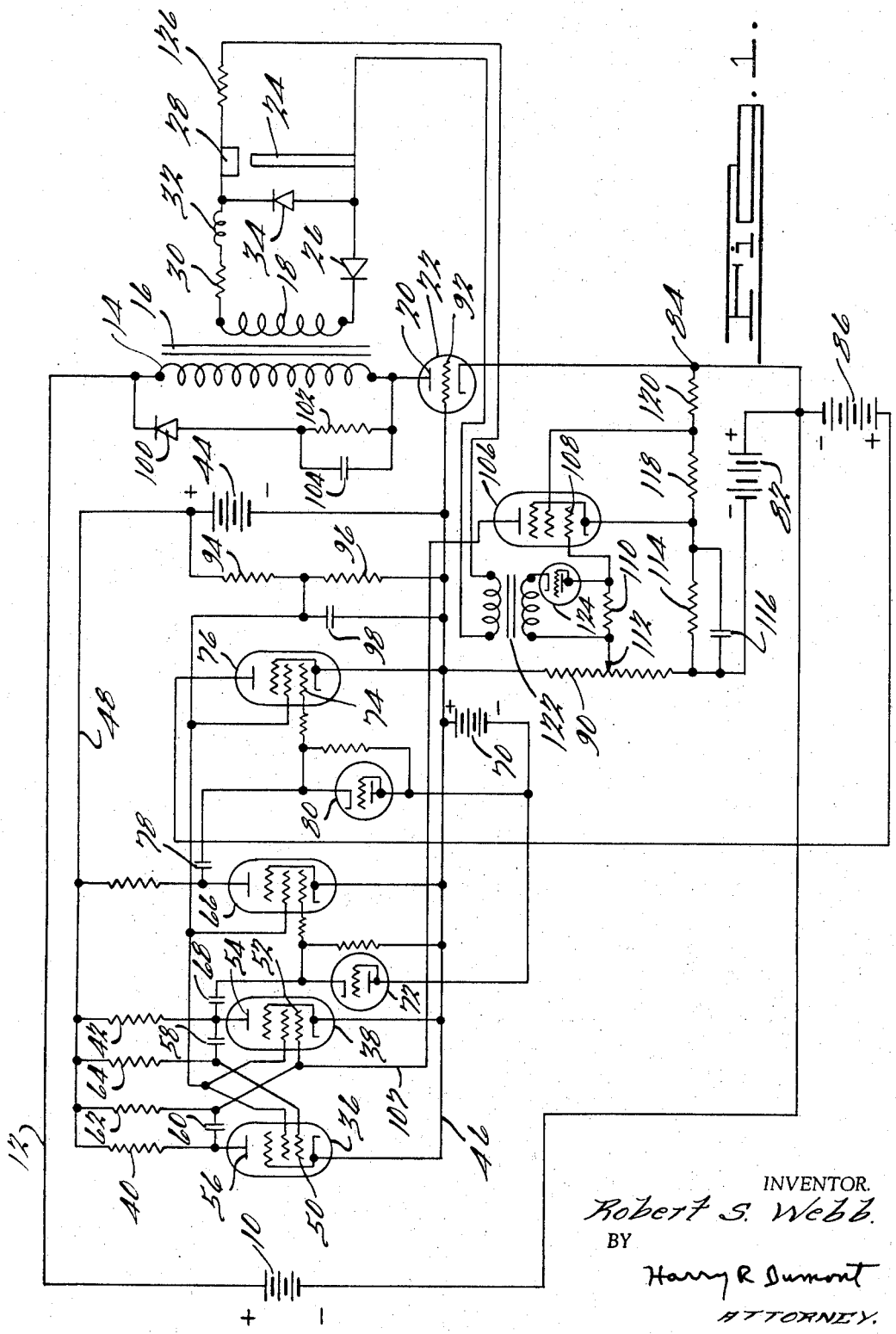
INVENTOR.
Robert S. Webb.
BY Harry R. Dumont
ATTORNEY.

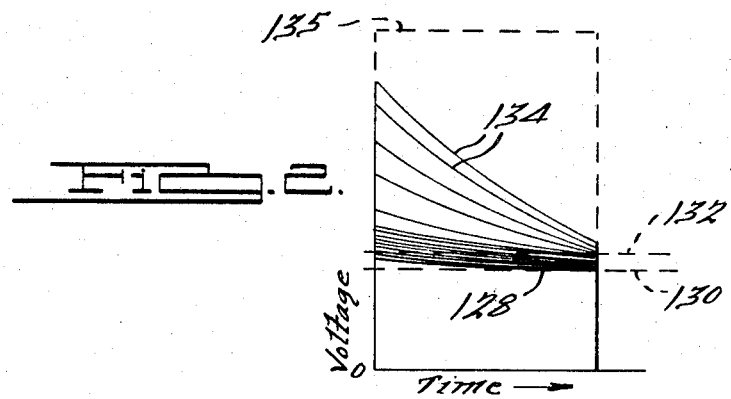
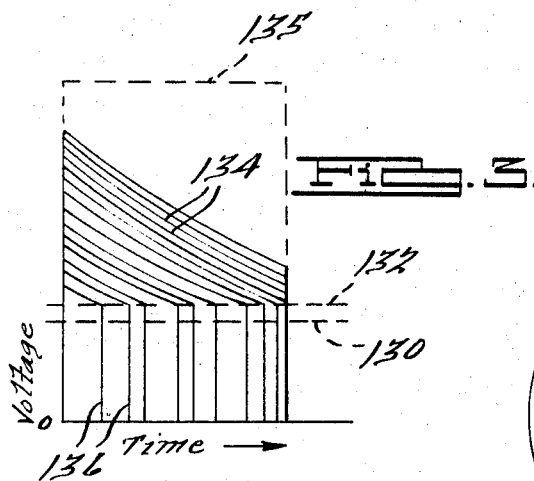
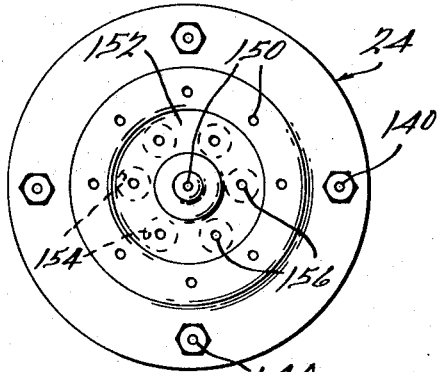
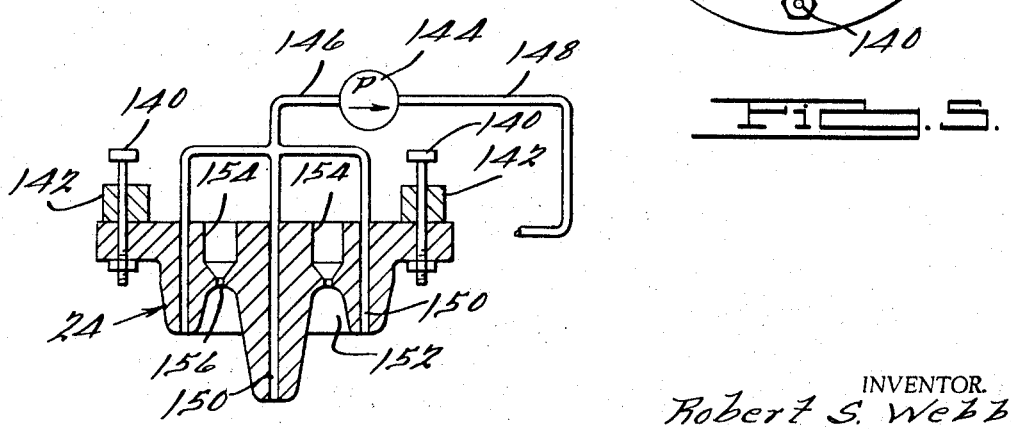

3,378,667
PER PULSE CUTOFF ELECTRICAL DISCHARGE MACHINING APPARATUS
Robert S. Webb, Bloomfield Hills, Mich., assignor to Elox Corporation of Michigan, Troy, Mich., a corporation of Michigan
Continuation-in-part of application Ser. No. 43,361, July 18, 1960. This application Oct. 2, 1963, Ser. No. 313,369
8 Claims. (Cl. 219—69)

ABSTRACT OF THE DISCLOSURE

A power supply circuit and method for relatively high voltage electrical discharge machining in which machining pulses are inspected and those not in excess of the normal arc drop voltage are interrupted.

This application is a continuation-in-part of my application Ser. No. 43,361, filed July 18, 1960, now abandoned.

Precision electrical discharge machining or EDM as it is referred to hereinafter is generally performed with suitable apparatus utilizing a negative electrode and a positive workpiece at gap voltages in the order of thirty to fifty volts average voltage with peak voltage of about 80 volts. Under certain conditions, utilization of higher voltages, i.e. 150 to 400 volts and even higher, across the gap provides a distinct advantage. I have found that it is possible when machining with relatively high striking voltages, for example, in excess of 150 volts and with relatively low frequency pulsing across the gap, to machine with a greatly increased number of discharges of higher arc drop voltage across the gap. By "arc drop voltage," I mean the voltage drop occurring across the machining gap during each discharge.

Under a unique combination of conditions of low frequency gap firing, high machining current, proper electrode material and proper coolant circulation, it is possible to achieve a high percentage of these higher arc drop discharges without specialized periodic or per pulse cutoff circuitry. By "per pulse cutoff circuitry," I mean circuitry in which each individual machining pulse is electronically inspected and either permitted to pass or interrupted an exceeding short time duration after its initiation and substantially prior to its normal completion. However, use of per pulse cutoff circuitry adjusted such that no discharge can occur unless the arc drop voltage is in excess of the normal arc drop voltage will result in all of the machining being carried on at this specialized level with a greatly increased number of high arc drop voltages occurring across the gap.

Commercial EDM machines of the relaxation oscillator or RC type operating at striking voltages as high as 200 volts may be utilized in the practice of the present invention utilizing specialized cutoff control to interrupt discharging if the arc drop voltage falls below predetermined limits.

In accordance with the principles enunciated above, it is an object of this invention to provide apparatus for EDM which provides machining pulses of a voltage at least two times the magnitude of normal arc drop voltage required for firing the gap, inspects each machining pulse and according to a predetermined voltage cutoff level in excess of the normal arc drop voltage allows passage of only those pulses having an arc drop voltage in excess of that level.

It is a further object of this invention to provide an improved process and means for EDM which maintains the machining gap under controlled conditions of eroded particle suspension and coolant circulation and passes only those pulses having a voltage in excess of normal arc drop voltage.

While my invention may take various forms and may involve a variety of different circuits, I will describe below a specific example for the purpose of teaching the invention to those skilled in the art.

In the drawings accompanying this specification:
FIGURE 1 is a typical EDM power supply circuit incorporating per pulse cutoff circuitry and capable of being operated in accordance with the teachings herein set forth;
FIGURE 2 is a voltage waveform diagram showing machining pulse characteristics in a normally operating EDM apparatus;
FIGURE 3 is a voltage waveform diagram showing machining pulse characteristics in an EDM apparatus modified in accordance with the teaching of the present invention;
FIGURE 4 is a vertical cross-sectional view of an electrode and a schematic showing of the dielectric circulation system utilized in the practice of the present invention; and
FIGURE 5 is a bottom plan view of the electrode of FIGURE 4.

Referring to FIGURE 1, it will be seen that I have indicated by the numeral 10 the main power supply for the apparatus which comprises a 300 volt D.C. supply, this voltage being about maximum for the plate supply of the 6AS7 power tubes utilized in the circuit. A lead 12 from the positive side of the power supply connects to one side of primary 14 of the power transformer 16. The latter has a secondary 18 and is of the iron-core type, although an air-core transformer may be used for more precise machining, particularly in the performance of finishing operations. The other side of primary 14 is connected to the anode 20 of a power tube 22. It will be understood that the tube 22 represents a bank of tubes, in this instance, a plurality of 6AS7's connected in parallel and in the number required to provide the necessary power flow through the gap. The secondary 18 of the power transformer 16 is connected at one side to the electrode 24 through a blocking diode 26, and at the other side to a workpiece 28. The elements 30 and 32 represent, respectively, the lumped resistance and lumped inductance of the leads from the secondary 18 to the gap between the electrode and workpiece. The gap is shunted by a second blocking diode 34 for a purpose to be explained hereinafter.

The power tube bank 22 is controlled by a multivibrator network which comprises tubes 36 and 38. These tubes are preferably pentodes, type 6DQ5. The plates or anodes of these tubes are connected through load resistors 40, 42 and lead 48 to the positive terminal of a suitable power supply 44, the negative terminal of which is connected with the cathodes of the tubes by lead 46. The power supply 44 may be separate or it may be derived from the main supply 10 as desired. The control grids 50, 52 of the tubes 36, 38 are cross-connected to anodes 54, 56, respectively, through coupling condensers 58, 60 and are connected to the positive side of the multivibrator power supply through the grid resistors 62, 64. The output signal from multivibrator tubes 36, 38 is fed into an amplifier, which may comprise one or more pentode tubes 66, through condenser 68 and clamped to negative bias voltage 70 through diode 72. The amplified and resquared signal from tube 66 is fed to the grid 74 of pentode 76, which may be one of a bank of parallel connected tubes, where it is again amplified before being fed to the power tube bank 22. The coupling to the driver tube 76 is through a coupling condenser 78 and a clamping diode 80 is provided to resquare the signal at this stage. Suitable isolation and signal resistors are also provided as shown to provide proper pulse operation of each stage of amplification.

The power required to drive the main power tube bank 22 is in the order of several hundred watts and, to obtain increased efficiency, the amplifier 76 is floated in the grid circuit of the bank 22 rather than connected to one terminal of bias supply 82 as ordinarily would be expected. Since the control signal appears between the cathode of driver 76 and point 84 of the circuit which is grounded, the network just described, which comprises a multivibrator and two stages of amplification, may be considered as a floating signal source. The output signal from this network is of rectangular wave form and is of substantially greater power magnitude than that obtained from the conventional square wave generator. Normally, these signal generators have an output of approximately ten watts. In the EDM circuit of FIGURE 1, the power required to drive the grids of the tube bank 22 is in the order of two hundred watts or more. A booster power supply 86 is preferably provided in series with the bias supply 82 to provide adequate voltage for the plate of driver tube 76. The output signal pulse from driver tube 76 is developed from the voltage drop across potentiometer 90, which signal pulse with the added voltage of power source 82 constitutes the drive to the grids 92 of the bank 22. Proper adjustment of the circuit parameters will provide a signal at grids 92 having a selected on-time characteristic. As stated above, the signal generator power supply is the source 44. Resistors 94 and 96, the latter being shunted by a condenser 98, are provided as shown as a source of screen voltage for tubes 36, 38, 66, and 76.

The primary 14 of transformer 16 has a damping network consisting of diode 100, resistor 102 and capacitance 104 connected in shunt therewith. The transformer 16 must be a stepdown transformer capable of handling relatively high currents at relatively high frequencies. The development of extremely thin iron lamination stock and specialized design now makes possible the design of transformers having the characteristics required for the circuit of FIGURE 1. The transformer selected should have a maximum voltage swing on the primary equal to the peak voltage rating of the power tube selected and a turns ratio which will provide the gap voltage required for EDM. The aforementioned damping network limits the induced voltage or negative flyback in the primary 14, which occurs between power pulses, to the voltage rating of the tubes 22 and therefore prolongs the lives of these tubes.

As thus far described, it will be seen that the tube bank 22 normally is biased to non-conducting condition by voltage source 82. An amplified signal from the multivibrator will be impressed on the grids 92 of the power bank 22 and will overcome the normal grid bias to render the tube bank conductive. In accordance with the preselected adjustment of the circuit paramenters, a voltage will occur across the primary 14 which will induce a voltage in the secondary 18. This secondary voltage is instantly effective across the gap between electrode 24 and workpiece 28, and a power pulse will be delivered across the gap for the purpose of eroding the workpiece. This sequence is repeated at high frequency until the machining operation is completed or the operation interrupted by the machine power feed, in a manner well known in the art. The gap between electrode 24 and workpiece 28 is flooded with dielectric fluid during machining as is common in EDM.

The circuit of FIGURE 1 includes a per pulse cutoff device automatically to cut off the power to the gap in event of a short circuit condition, which might damage the workpiece, or in event of malfunction of the apparatus, which might cause damage to the workpiece or to the components of the apparatus. This per pulse cutoff device comprises a pentode 106, the control grid 108 of which is connected through a resistor 110 to tap 112, which is the adjustable tap of potentiometer 90. The grid 108 normally is biased non-conducting by the shunt resistor and condenser network 114, 116 which is connected across the voltage source 82 through the screen voltage resistor 118 and the voltage reducing resistor 120. The voltage across potentiometer 90 plus that of the source 82 is the voltage which drives the grids 92 of the power tube bank 22. A selected portion of this voltage is thus effective on the grid 108 of cutoff tube 106 and tends to render tube 106 conductive whenever bank 22 is rendered conductive. The plate of tube 106 is connected to the grid circuit of multivibrator tube 38 by line 107 and conduction through tube 106 will instantaneously cut off operation of the multivibrator. The secondary of a transformer 122, which functions as a cutoff transformer, is connected across the resistor 110 through a blocking diode 124. The primary of the transformer 122 is connected across the gap between electrode 24 and workpiece 28 through a limiting resistor 126.

If the apparatus is functioning normally, a drive signal on grids 92 of the bank 22 will result in a striking voltage appearing across secondary 18 of power transformer 16 and the gap will fire. This voltage would have to be only about 20 volts if there were no losses in the firing circuit. However, normal circuit losses require a voltage magnitude of 60 volts or more, and should a short circuit occur across the gap, the short circuit current would be almost 150% of normal. With narrow pulse operation, the peak current selected is usually the peak pulse rating of the individual tubes of the power tube bank, and a 150% overload of this pulse current would strip the tube cathodes with comparatively few pulses. Thus, ordinary short circuit cutoff devices such as thermally responsive devices operate too slowly to provide adequate protection.

My per-pulse cutoff device permits the power circuit to be operated with maximum efficiency because it renders it unnecessary to limit the power input to the gap to less than maximum desired on account of the possibility of short circuits. The cutoff device operates to cutoff the power input instantaneously, that is to say, in about 5% of the period of a power pulse, and thus provides complete safety to the apparatus. This cutoff device is extremely important in the operation of the machine especially when precision machining of expensive workpieces is being performed where heat checking of the hole being cut might require scrapping of the piece. The readiness of the device to function instantly is constantly maintained by the precise balancing of the circuit parameters. The connection of grid 108 to the keying potentiometer 90 tends to render tube 106 conductive each time the multivibrator pulses, but the dominating negative bias of the network 114–116 inhibits conduction of tube 106 in the absence of any keying signal. During normal operation, the keying pulse voltage developed across potentiometer 90 is exactly neutralized in the grid circuit of tube 106 by the action of circuit 122, 124, 110. However, appearance of a voltage across the primary of transformer 122 representative of arc drop voltage lower than a preset minimum will upset this voltage balance and instantaneously cause tube 106 to conduct and thus cutoff the multivibrator through line 107. It is, of course, clear that the "leading edge" of the power pulse just initiated will cross the gap, but the cutoff is so fast that the power pulse will be literally squelched after initiation and no appreciable power will be delivered to the gap.

Interruption of operation of the multivibration will, of course, cutoff tube bank 22 as well as tube 106. After the normal pulse repetition delay time, the multivibrator will resume pulsing, and if the trouble in the gap which caused the abnormally low voltage has cleared, such as by backup of the power feed, clearing of sludge, or the like, normal machine operation will be restored automatically.

FIGURE 2 shows the voltage waveform of pulses as they normally occur across the machining gap. Open circuit voltage across the gap is indicated by the line 135. The waveform as shown represents an oscillogram of machining pulses with repeat synchronization on the leading edge of each pulse. It will be seen that the vast majority of discharge pulses 128 occur within a relatively narrow band or range of arc drop voltages which range may be referred to as the normal arc drop voltage. As an example, for an EDM circuit providing peak voltages of approximately 80 volts and utilizing zinc alloy electrodes, the bank of voltage pulses would have arc drop voltages between 15–17 volts as indicated between lines 130–132. Only a relatively small number of discharge pulses 134 occur with arc drop voltages above that range.

FIGURE 3 illustrates the voltage waveform of pulses occurring across the gap in a circuit in which a per pulse cutoff has been established at a level above the normal arc drop voltage as indicated between lines 130–132. It will be seen that, while the pulses of gap voltage below the 17 volt level have been interrupted, a greatly increased number of pulses of greater arc drop voltage now occur across the gap. Machining therefore is conducted at a substantially higher arc drop voltage in excess of the maximum normal discharge voltage across the gap as indicated by the horizontal line 132. Vertical lines 136 are representative of pulse trailing edges of pulses that have been cutoff. In a manner completely contrary to expectations, a greatly improved mode of electrical discharge machining results from the elimination of all pulses having arc drop voltages in the normally occurring range.

FIGURES 4 and 5 illustrate the mode of construction of a type of electrode and a coolant circulation system particularly suitable for use in conjunction with and in furtherance of the practice of the present invention. To promote the most effective operation of electrical discharge machining at higher levels of arc drop voltage, I have found that in the gap between workpiece and electrode there should be maintained a particular type flow of dielectric coolant carrying previously eroded particles from the workpiece. This mode of dielectric circulation by suction withdrawal from the gap rather than positive pressure maintains a continuous suspension of eroded particles in the gap between workpiece and electrode. In FIGURE 4, the electrode 24 is shown adapted for attachment to a platen by T-bolt 140 with spacers 142 included to provide a free path for dielectric fluid from the workpan, not shown, in which the electrode and workpiece are normally contained. Pump 144 is employed to provide a coolant flow under constant pressure in the direction indicated to make line 146 a suction line and line 148 a pressure line. Line 146 terminates in a plurality of mutually spaced conduits 150 extending through electrode 24 and terminating in its lower or machining face. It will be seen that the machining face of electrode 24 includes a plurality of protuberances and each conduit 150 extends through its respective protuberance. Line 148 provides dielectric fluid return to the workpan. In the process of EDM, the dielectric tends to decompose under compression by the pump and form air bubbles. Additionally, the minute localized discharges occurring at extremely high temperatures in the gap decompose the dielectric to form gas bubbles. To remove this gas from the system from the plurality of pockets 152 inherent in this complex electrode, vent holes are provided in the machining face of electrode 24. Countersunk exhaust vent holes 154 for the gap communicate with pockets 152 through the smaller diameter holes 156 at the face of the electrode. It will thus be seen that any gas entrapped in pockets 152 is exhausted through vent holes 154 to atmosphere to maintain the gap free of gas while providing the particular flow and thus permits most efficient operation of the EDM process.

FIGURE 5 is a bottom plan view showing the spaced placement of suction lines 150 and vents 154 to provide optimum flow of coolant in the gap to promote electrical discharge machining at higher arc drop voltage levels after the manner of the present invention.

I have discovered that under ideal coolant circulation conditions, best brought about by low frequency machining at relatively high current levels, a peculiar phenomenon results. It performs identically in every way to normal EDM except that a greatly increased number of gap discharges or power pulses may be produced at levels in excess of the nominal 15 to 17 volt level which constitutes the normal arc discharge voltage. Under ideal conditions of low frequency, high machining current, proper electrode material and coolant circulation conditions as hereinbefore set forth, it is possible to achieve a high percentage of these higher voltages discharges by establishing a cutoff level by a device periodically operable at a level above the normal arc drop voltage without specialized per pulse operating cutoff circuitry. As has previously been indicated, the normal arc drop voltage occurring in the EDM gap may vary between 15 and 17 volts which voltage depends on electrode, workpiece and coolant combinations and other conditions existing in the gap. A cutoff device may be utilized to periodically inspect or average arc drops and cutoff those pulses having an arc drop voltage not attaining a predetermined magnitude level in excess of this value. For example, if the predetermined cutoff level is maintained at a value above 17 volts, passage of those pulses initiating higher than normal arc drop discharges is assured. If a per pulse cutoff circuitry is utilized, it may be adjusted specifically so that no normal voltage discharge or short circuit pulses may exist and all machining is conducted at this new and specialized level and therefore per pulse cutoff is preferred but not essential. Machining of the electrical discharge type performed in the manner of the present invention makes possible an even greater separation between the electrode and workpiece with better thermal isolation. The precise nature of the phenomenon in which the occurrence of a greatly increased number of higher arc drop voltage pulses across the gap causes the improved results is not known. With regard to the maintenance of the prescribed coolant circulation in the gap, it appears that the presence of a continuous suspension of eroded particles in the gap contributes largely to the improved end results. The eroded particles may provide a barrier layer intermediate the gap elements or in adherence to the machining face of the electrode tool. The resultant increased arc drop voltages cause a greatly improved wear ratio, that is, less electrode wear which is a major consideration in EDM. Additionally, I have found that the maximum metal removal rate practical with a given electrode is appreciably increased by the practice of electrical discharge machining using the method and apparatus of my invention.

Thus, it will be seen that I have provided a novel and improved method and means for electrical discharge machining. Those skilled in the art will visualize other modifications and variations of the invention set forth hereinbefore without departing from its spirit and scope.

I claim as my invention:

1. In an apparatus for machining a conductive workpiece by erosive electrical discharges across a dielectric filled gap between a machining electrode and the workpiece, a power supply for providing pulses at least two times the magnitude of normal arc drop voltage for firing the gap, and a cutoff means operatively connected to said power supply and the gap, said cutoff means operable in response to arc drop voltages not in excess of the normal arc drop voltage to interrupt pulses from said power supply.

2. In an apparatus for machining a conductive workpiece by erosive electrical discharges across a dielectric filled gap between a machining electrode and the workpiece, a power supply for providing machining pulses at least two times the magnitude of normal arc drop voltage for firing the gap, and a cutoff means operatively connected to said power supply and the gap, said cutoff means operable in response to arc drop voltages not in excess of the normal arc drop voltage to interrupt pulses from said power supply after initiation but prior to normal completion of each individual pulse.

3. The combination as set forth in claim 2 in which said cutoff means comprises a cutoff tube and a transformer having its primary winding connected across the gap and its secondary winding connected to the control grid of said cutoff tube.

4. In an apparatus for machining a conductive workpiece by erosive electrical discharges across a dielectric filled gap between a machining electrode and the workpiece, a power supply for providing pulses at least two times the magnitude of normal arc drop voltage for firing the gap, and a cutoff means operatively connected to said power supply and the gap, said cutoff means periodically operable to cut off those pulses from said power supply having arc drop voltages not in excess of the normal arc drop voltage.

5. In an apparatus for machining a conductive workpiece by erosive electrical discharge arcoss a dielectric fluid filled gap between a machining electrode and the workpiece, a power source, a switch connected to said source operable to deliver power pulses at least two times the magnitude of normal arc drop voltage for firing the gap, a pulser operatively connected to said switch for pulsing said switch, and a cutoff means operatively connected to said pulser and the gap, said cutoff means operable in response to an arc drop voltage not in excess of the normal arc drop voltage to interrupt operation of said switch after initiation of but prior to normal completion of an individual pulse.

6. The combination as set forth in claim 5 in which said cutoff means comprises a cutoff tube having its output operatively connected to said pulser and a transformer having its primary winding connected across the gap and its secondary winding connected to the control grid of said cutoff tube.

7. In an apparatus for machining a conductive workpiece by an electrode across a dielectric filled gap, a power supply, means operatively connected to said supply for providing erosive electrical discharges across the gap of a voltage at least two times the magnitude of normal arc drop voltage for firing the gap, and a cutoff means operatively connected to said supply and the gap, said cutoff means operable to interrupt discharges in response to arc drop voltage not in excess of the normal arc drop voltage.

8. The process of machining a conductive workpiece by erosive electrical discharge across a gap between an electrode tool and the workpiece in the presence of a dielectric coolant which comprises, passing a series of power pulses across the gap at a predetermined voltage magnitude at least two times the magnitude of the normal arc drop voltage, inspecting the voltage magnitude of each pulse at the point of its initiation, and cutting off before its normal completion each power pulse not exceeding said normal arc drop voltage.

References Cited

UNITED STATES PATENTS

| | | | |
|---|---|---|---|
| 2,787,279 | 3/1957 | Williams | 219—69 |
| 2,981,822 | 4/1961 | Larkins | 219—69 |
| 3,018,411 | 1/1962 | Webb | 219—69 X |

RICHARD M. WOOD, *Primary Examiner.*

R. F. STAUBLY, *Assistant Examiner.*